(12) United States Patent
Gwilliams et al.

(10) Patent No.: US 11,907,376 B2
(45) Date of Patent: Feb. 20, 2024

(54) COMPLIANCE VERIFICATION TESTING USING NEGATIVE VALIDATION

(71) Applicant: Saudi Arabian Oil Company, Dhahran (SA)

(72) Inventors: John Gwilliams, Dhahran (SA); Sultan Saadaldean Alsharif, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 486 days.

(21) Appl. No.: 17/229,158

(22) Filed: Apr. 13, 2021

(65) Prior Publication Data
US 2022/0327217 A1 Oct. 13, 2022

(51) Int. Cl.
*G06F 21/57* (2013.01)
*G06N 20/00* (2019.01)
*G06Q 50/26* (2012.01)

(52) U.S. Cl.
CPC ........... *G06F 21/577* (2013.01); *G06N 20/00* (2019.01); *G06Q 50/265* (2013.01); *G06F 2221/034* (2013.01)

(58) Field of Classification Search
CPC .... G06F 21/577; G06N 20/00; G06Q 50/265; H04L 63/18; H04L 63/20
See application file for complete search history.

(56) References Cited

U.S. PATENT DOCUMENTS

| | | | |
|---|---|---|---|
| 8,336,080 B2 | 12/2012 | Herrod | |
| 8,898,734 B2 | 11/2014 | Singh et al. | |
| 9,009,084 B2 | 4/2015 | Brandt et al. | |
| 10,360,408 B1 | 7/2019 | Kincaid et al. | |
| 10,572,670 B2 | 2/2020 | Nolan | |
| 11,611,590 B1* | 3/2023 | Amar | G06N 20/00 |
| 2008/0282320 A1 | 11/2008 | Denovo | |
| 2009/0299896 A1* | 12/2009 | Zhang | G06Q 40/00 705/38 |

(Continued)

FOREIGN PATENT DOCUMENTS

WO 2020005715 1/2020

OTHER PUBLICATIONS

Yong Fang et al, FastEmbed: Predicting vulnerability exploitation possibility based on ensemble machine learning algorithm, PLOS ONE (Year: 2020).*

*Primary Examiner* — Shanto Abedin
(74) *Attorney, Agent, or Firm* — Fish & Richardson P.C.

(57) ABSTRACT

Methods and systems, including computer programs encoded on a computer storage medium, implement compliance testing to evaluate controls used to protect assets of a target system. A respective first score is generated for each control based on compliance tests performed to detect each of the controls at the target system. A compliance model is generated that integrates machine-learning algorithms to classify inputs corresponding to a compliance test and to enable predictive analytics of the compliance model using the classified inputs. The compliance model derives a negative compliance test (nCT) for each of the compliance tests by applying the predictive analytics to a data set that includes the first score for each control. An nCT is performed for each control detected at the target system and a second score is generated for each nCT. An assurance score characterizing effectiveness of the control is generated based on the first and second scores.

20 Claims, 6 Drawing Sheets

(56) References Cited

U.S. PATENT DOCUMENTS

| | | |
|---|---|---|
| 2016/0330222 A1 | 11/2016 | Brandt et al. |
| 2017/0126741 A1 | 5/2017 | Lang et al. |
| 2018/0352003 A1 | 12/2018 | Winn et al. |
| 2019/0286825 A1 | 9/2019 | Ponnuru et al. |
| 2020/0265144 A1 | 8/2020 | Gwilliams |
| 2020/0304533 A1 | 9/2020 | May et al. |
| 2021/0021636 A1* | 1/2021 | Sbandi ................ H04L 63/1466 |
| 2021/0133648 A1* | 5/2021 | Bennett ............... G06F 21/6245 |

\* cited by examiner

| TEST NUMBER | DESCRIPTION | POSSIBLE TEST RESULT | NUMERICAL RESULT |
|---|---|---|---|
| t(1) | TEST SCENARIO 1 | PASS \| FAIL | 1 \| 0 |
| t(2) | TEST SCENARIO 2 | PASS \| FAIL | 1 \| 0 |
| t(3) | TEST SCENARIO 3 | PASS \| FAIL | 1 \| 0 |
| ○○○ | ○○○ | ○○○ | ○○○ |
| t(y-1) | TEST SCENARIO (y-1) | PASS \| FAIL | 1 \| 0 |
| t(y) | TEST SCENARIO (y) | PASS \| FAIL | 1 \| 0 |

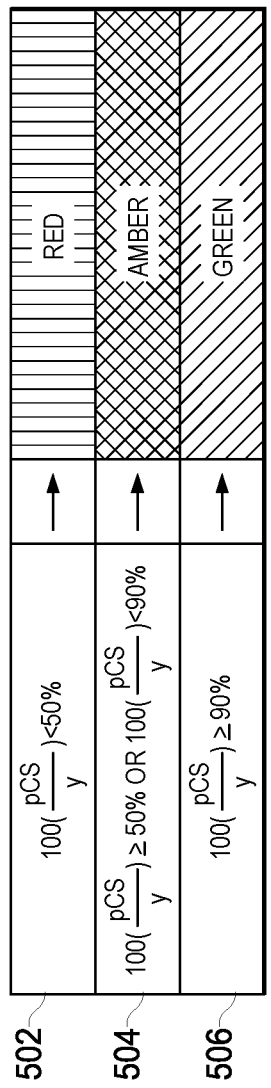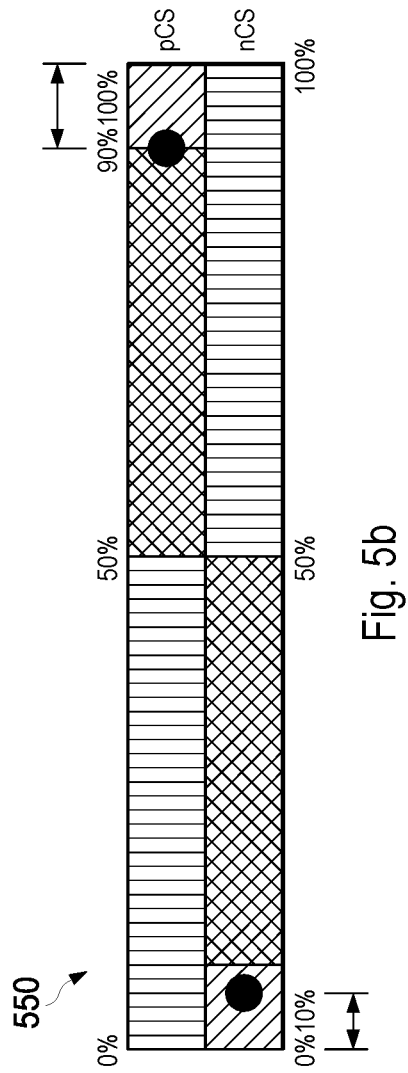

COMPLIANCE VERIFICATION TESTING USING NEGATIVE VALIDATION

TECHNICAL FIELD

This specification relates to using negative validation to evaluate sufficiency of controls used to satisfy a compliance requirement.

BACKGROUND

A system, device, or computer network may include multiple assets that provide a desired function. For example, a computer system or network can include several assets, such as routers, servers, or client devices, which enable individuals or users to access shared resources including a variety of digital content accessible by the Internet. In general, devices and assets such as those that access the internet and other networked resources (e.g., that are external to a local network) present a variety of security challenges. For example, the assets may be susceptible to unauthorized access, data breaches, or other attacks from malicious users.

These challenges and vulnerabilities drive compliance initiatives that specify controls that are required to protect an asset against security risks. Compliance management functions typically involve teams that assess the compliance of systems against a set of internal control requirements by testing for a documented control or a process associated with the control. This control can be any artefact on an example target system (e.g., computer system) such as the presence of a particular file, version of certain code, or a setting in a particular configuration file or registry key (to name but a few). Based on a number of successful test results, the target system can be assessed to determine whether it is in compliance with a specified standard.

SUMMARY

The technology described in this specification provides a technique for testing whether sufficient controls are in place to meet a defined compliance regime. The technique combines positive tests that verify whether system controls are designed effectively with negative tests that verify whether the implemented controls actually provide the relevant protection. A positive test is described alternatively as a positive compliance test (pCT), whereas a negative test is described alternatively as a negative compliance test (nCT). Relatedly, a positive test generates a result that is characterized as a positive compliance score (pCS), whereas a negative test generates a result that is characterized as a negative compliance score (nCS). Using a comparison of a pCT result with an nCT result, the disclosed techniques provide an approach for increasing a confidence in the validity of compliance test results. This approach can also provide a desired or correct level of assurance that implemented controls actually protect an entity's assets (e.g., critical assets).

One aspect of the subject matter described in this specification can be embodied in a computer-implemented method of compliance testing to evaluate controls used to protect assets of a target system. The method includes generating a respective first score for each control based on compliance tests that are performed to detect each of the controls at the target system and generating a compliance model that integrates machine-learning algorithms to: i) classify inputs corresponding to a compliance test, and ii) enable predictive analytics of the compliance model using the classified inputs.

The method includes deriving, by the compliance model, a negative compliance test for each of the compliance tests by applying the predictive analytics to a data set that includes the respective first score for each of the controls. For each control detected at the target system, the method includes: performing a negative compliance test that corresponds to a compliance test performed to detect the control; generating a second score for the negative compliance test that is performed; and based on a comparison of a first score for the control and the second score, generating an assurance score that characterizes effectiveness of the control at protecting an asset of the target system.

These and other implementations can each optionally include one or more of the following features. For example, in some implementations, deriving a negative compliance test includes: processing, based on the predictive analytics of the compliance model, information in the data set that describes assessment of a first control used to protect the asset of the target system; in response to processing the information, computing, by the compliance model, inferences that are indicative of a particular negative compliance test to be performed to assess a protection feature of the first control; and based on the computed inferences, deriving a first negative compliance test to assess effectiveness the first control and the protection feature at protecting the asset.

In some implementations, the method includes: negatively validating effectiveness of the first control and the protection feature at protecting the asset based on an outcome of the first negative compliance test. In some implementations, the predictive analytics of the compliance model includes a negative validation algorithm that is applied to each first score to validate a respective accuracy of the first score.

In some implementations, a first control includes a response function that is responsive to a particular incident; and the negative validation algorithm is applied to a corresponding first score for the first control to negatively validate efficacy of the response function. The particular incident can indicate an attempt at unauthorized access of the asset and the response function of the first control protects the asset by precluding unauthorized access.

In some implementations, generating the assurance score includes: determining a measure of effectiveness of the control at precluding unauthorized access to an asset of the target system; and generating the assurance score based on the determined measure of effectiveness. The assurance score can quantify the measure of effectiveness of the control at precluding unauthorized access to the asset of the target system.

In some implementations, the first score is a positive compliance score that indicates presence of a given control configured to protect the asset; and the second score is a negative compliance score that assess a capability of the given control to protect the asset. In some other implementations, the method includes: generating a percent compliant based on the respective first score for each of the controls; applying the percent compliant to a boundary condition that defines a risk profile of an entity that includes the target system; and determining an asset rating that characterizes protection of the asset relative to the boundary condition in response to applying the percent compliant to the boundary condition.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented to realize one or more of the following advantages. The disclosed techniques provide an algorithm to increase assurance that a pCT result or pCS provides an accurate assessment of a control's effectiveness at protecting a system or entity's nominal and critical assets.

An algorithmic framework is provided within which additional testing can be performed to verify an accuracy of positive testing outcomes for a control in the pCT algorithm. For example, a successful testing outcome can indicate that a valid security patch or updated anti-virus program (e.g., the control) is installed at an asset. The disclosed technique of negative validation can then be used to verify that the patch is actually effective at protecting the asset against a security incident or that the anti-virus is actually effective at detecting and removing a debilitating computer virus.

The disclosed techniques can also be used to automatically construct negative compliance tests (nCTs) for executing the technique of negative validation. The nCTs are configured to challenge a response function of a control to validate efficacy of the response function at protecting an asset from an identified security risk. The techniques and framework can be used to increase a confidence that compliance test results are reliable indicators of the validity and integrity of a given control. The disclosed approach to compliance verification testing can provide the correct level of assurance that implemented controls actually protect a company's assets.

The details of one or more embodiments of these systems and methods are set forth in the accompanying drawings and the following description. Other features, objects, and advantages of these systems and methods will be apparent from the description and drawings, and from the claims.

BRIEF DESCRIPTION OF THE DRAWINGS

FIG. 5A is an example illustration that shows a method of calculating a percentage compliant result and corresponding boundary conditions for different percentage results.

FIG. 5B shows an example illustration used to graphically represent a positive compliance score (pCS) and a negative compliance score (nCS).

Like reference numbers and designations in the various drawings indicate like elements.

DETAILED DESCRIPTION

This specification describes an example verification system that is configured to perform compliance verification testing using negative validation. The system implements compliance testing to evaluate controls that are used to protect assets of a target system.

The system generates a respective first score for each control based on compliance tests that are performed to detect each of the controls at the target system. The compliance tests are positive compliance tests (pCT) that can indicate whether system controls are designed effectively, but that are unable to ensure that an implemented control is actually effective at protecting an asset of the system. The system generates a compliance model that integrates one or more machine-learning (ML) algorithms. For example, the system integrates the ML algorithms to classify inputs corresponding to a compliance test and to enable predictive analytics of the compliance model using the classified inputs.

The compliance model derives a negative compliance test (nCT) for each of the compliance tests by applying the predictive analytics to a data set that includes the first score for each control. An nCT is performed for each control detected at the target system and a second score is generated for each nCT. An assurance score characterizing effectiveness of the control is generated based on the first and second scores.

Figure 1:
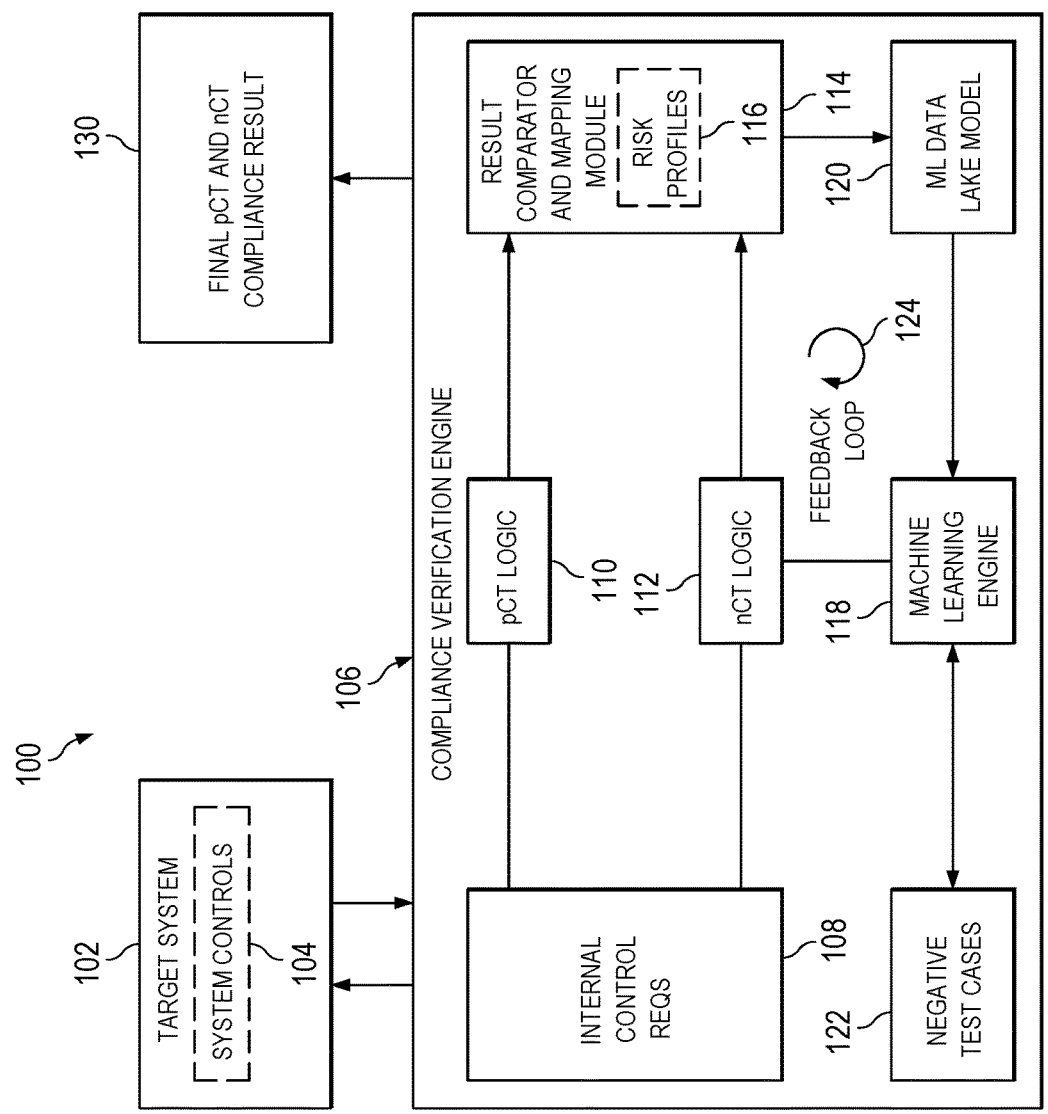
FIG. 1 illustrates an example computing system used to implement compliance verification testing using negative validation.

FIG. 1 illustrates an example computing system 100 that implements compliance verification testing using negative validation. The system 100 can be an example verification system configured to implement negative validation to perform compliance verification, as described in detail below. The system 100 includes a target system 102, a set of system controls 104, and a compliance verification engine 106. The target system 102 can be a system, device, or computer network that includes multiple assets. Each asset can provide, enable, or be associated with a function of the target system that used by an individual.

The target system 102 can be a physical item, a digital item, or both. For example, the target system 102 can be a computing device or a computer network (e.g., local area network) of a business entity. In some instances, the target system 102 is an operating system of a computing device, an application program of an operating system, individual servers of a computer network, or a combination of these. In this these instances, assets of the target system 102 can include an application program (e.g., a native application or "app") of an operating system, processing devices or data serving protocols of a server, a computing node of the network, or a combination of these.

In some other instances, the target system 102 is a physical construct such as a commercial building or residential property. In this these instances, assets of the target system 102 can include digital and physical locks, electronic access points that restrict or permit access to the physical construct, a property monitoring system that monitors the construct, or a combination of these. In general, a target system 102 can be any software or hardware item that includes one or more assets for which a control has been developed or specified to protect the asset against an identified risk.

The verification engine 106 includes one or more datasets for implementing compliance verification testing of the controls 104. For example, the verification engine 106 includes a dataset of internal control requirements 108. The control requirements 108 can be derived from a security baseline documentation that includes information about the controls 104. In some implementations, the verification engine 106 can be configured to access, obtain, or otherwise generate a dataset of control requirements 108 prior to, or concurrent with, execution of a compliance verification test of the target system 102.

The control requirements 108 can represent a defined list of detectable controls that are collated into a digital or electronic documents. These digital documents can include information that describes how to assess a security posture of a target system 102 relative to a set of internal or external requirements that are specific to a particular control. In some instances, the documents may be proprietary to a given organization, based on their internal requirements, or standardized by a specific vendor for general implementation.

The control requirements 108 include technical implementation details about a set of controls 104 that are linked to a target system 102. For example, the implementation details can specify technical items such as types of malware or viruses that are detectable by a given control 104. The details can also specify steps for installing, testing, or removing a control 104 that communicates with an asset of a target system 102. In some cases, the details may specify a type of device or asset (e.g., operating system version) to which a control 104 is assigned to protect. In some cases, the details may specify a model number and corresponding software version for an electronic, physical lock that restricts access to assets secured in a target system 102 that is a building.

The verification engine 106 includes pCT logic 110, nCT logic 112, and a comparator and mapping module 114. The pCT logic 110 and the nCT logic 112 cooperate to provide an algorithmic framework within which a subset of positive and negative compliance testing can be performed to verify an accuracy of positive testing outcomes for a control 104 of a target system 102. The framework implemented by the verification engine 106 works in conjunction with control requirements 108 such as security baselines or technical implementation documents. For example, the verification engine 106 can use these documents of the control requirements 108 as a source of positive test cases.

Additionally, the nCT logic 112 is used in conjunction with an example ML engine 118 to execute an aspect of the compliance verification testing that uses negative validation to provide accurate assessments of a control's effectiveness at protecting a system or entity's critical as well as nominal assets. In some implementations, data and information associated with a set of positive test cases represent a data source from which one or more negative test cases are derived negative. For example, as explained in more detail later, the negative test cases may be derived by the ML engine 118 based on one or more ML algorithms that are applied to the data and information associated with the positive test cases. In some implementations, a negative test case is derived for each positive one. These negative test cases provide the basis for the derivation of a score based on nCT.

The ML engine 118 is operable to generate, store, and modify a set of negative test cases 122. In some cases, each negative test case 122 can include steps or verification sequences that are supplied as inputs to the nCT logic 112 to execute a negative validation (or nCT) element of a compliance verification test. The ML engine 118 interacts with a ML data lake model 120 to refine the overall nCT logic 112 of the verification engine 106. For example, the nCT logic 112 can be refined based on an example feedback loop 124 that passes, to the ML data lake model 120, sets of pCT and nCT results (or scores) that are processed at the comparator and mapping module 114. The ML data lake model 120 is described in more detail later with reference to FIG. 3.

The comparator and mapping module 114 is configured to process and map a pCS and nCS to one of multiple boundary conditions in a set of boundary conditions. Each set of boundary conditions are specified by a risk profile 116 that is linked to a particular entity. In some implementations, the verification engine 106 includes multiple risk profiles 116, where each risk profile 116 corresponds to a different entity.

Given a target system 102, the verification engine 106 is configured to execute a series of verification tests for each control 104 in a set of identified controls. The series of verification tests include one or more of a pCT and a corresponding nCT for a given pCT. Execution of the nCT corresponds to a negative validation element of the disclose techniques for compliance verification testing. More specifically, the negative validation element is used to accurately evaluate whether each implemented control 104 provides an effective measure of protection against a risk that may affect an asset of the target system 102.

During an example compliance verification test a first score (a pCS) is generated to indicate an outcome of a first pCT and a second score (an nCS) is generated to indicate an outcome of a corresponding nCT. Each of the pCT and nCT are performed against an identified control 104 to assess effectiveness of the control 104 at protecting an asset of a target system 102. As described earlier, the nCT is derived for the pCT. In particular, the nCT is a negative compliance test that is derived to assess an effectiveness of a protection feature of the identified control 104 at protecting the asset against the risk. More specifically, the nCT is executed to negatively assess or validate effectiveness of the protection feature at protecting the asset based on an outcome of the negative compliance test.

The verification engine 106 uses an assurance score to characterize the assessment or evaluation of the control 104. For example, the comparator and mapping module 114 compares: i) the first score that indicates the outcome of the first pCT to the second score that indicates the outcome of the corresponding nCT. Using the comparator and mapping module 114, the verification engine 106 generates the assurance score based on the comparison of the first score for the control 104 and the second score for the control 104. The assurance score can represent a final pCT and nCT compliance result 130 that characterizes effectiveness of the control 104 at protecting the asset of the target system 102.

In this manner, the verification engine 106 is configured to execute an nCT element of compliance verification testing to provide an additional assurance in the overall compliance testing of a control 104.

Figure 2:
FIG. 2 shows an example table that includes multiple test cases.

FIG. 2 shows an example table 200 that includes multiple test cases. Traditionally a number of test cases {t1, t2, t3, t(y−1), t(y)} are described which can have a Pass or Fail result. A Pass results in a positive increment to the overall compliance (or assurance) score, such that, for a given number of test cases (y), the positive compliance score, pCS, is derived by a simple addition of the numerical result from each test case. This represents a traditional approach to compliance testing and represents how a set of positive compliance scores may be aggregated or combined to generate a composite pCS prior to comparison with a corresponding nCS that results from aggregation of a set of negative compliance scores.

In some cases multiple pCTs are performed, where each test case yields a respective result (Pass or Fail). In these cases the results may be accumulated such that a positive compliance score, pCS, is referred to as positive cumulative score, pCS.

For example, based on a subset of test cases, a positive cumulative score (pCS) can be calculated as: $pCS=\Sigma_{i=1}^{y}t(i)$. A percentage compliant result can be calculated as:

$$100\left(\frac{pCS}{y}\right).$$

Relatedly, based on a subset of test cases, a negative cumulative score (nCS) can be calculated as: $nCS=\Sigma_{i=1}^{x}nt(i)$. A percentage negative compliant result can be calculated as:

$$100\left(\frac{nCS}{x}\right).$$

In some implementations, the ML data lake model 120 is operable to execute an algorithmic framework for implementing a validation exercise such that if $t(a)>0$ the associate $nt(b)$ (i.e., negative test) is performed. In this implementation, 'a' equates to positive integers in the range '1 . . . y' and 'b' equates to positive integers in the range '1 . . . y'. The parameter 'y' is calculated as the total number of positive tests that pass the initial test $t(a)>0$.

Figure 3:
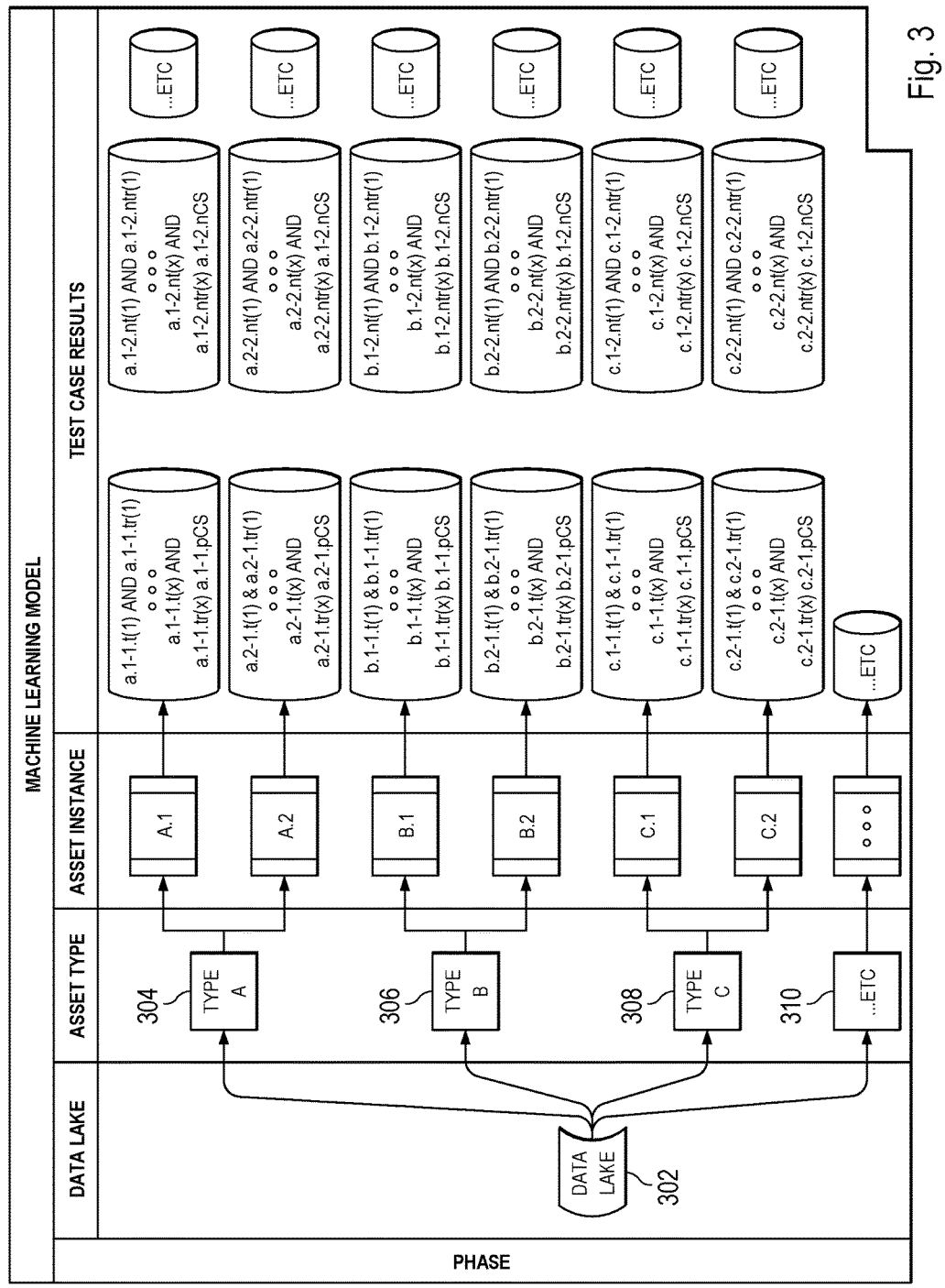
FIG. 3 illustrates a block diagram of a machine-learning data lake model that can be used in conjunction with the computing system of FIG. 1.

FIG. 3 illustrates a block diagram of an ML data lake model that can be used in conjunction with the example verification system 100 of FIG. 1. The ML data lake model 120 is representative of a compliance model that is generated by the system 100. As discussed earlier, the system 100 generates a compliance model that integrates one or more machine-learning (ML) algorithms and/or data models.

At least one algorithm is associated with a mathematical model that utilizes a set of negative test cases to verify positive compliance results. Some (or all) of the algorithms are agnostic to the underlying technology that is being tested. In some implementations, at least one algorithm associated with the mathematical model will be integrated into supervised and unsupervised machine learning algorithms to further automate classification and prediction capabilities of the overall ML data lake model 120.

The ML data lake model 120 can be based on one or more individual data models, where at least one data model integrates ML algorithms to classify inputs corresponding to a compliance test as well as to enable predictive analytics of the compliance model using the classified inputs. The data models may be based on different types of machine-learning technologies and trained in response to processing data values of the input dataset in accordance with algorithms for the technology. In some implementations, the ML engine 118 utilizes a supervised machine learning algorithm to classify input data (e.g., using decision trees) and an unsupervised algorithm to detect patterns (e.g., using association analysis) whereby future areas of concern can be predicted.

System 100 can include a training phase and an implementation phase. During the training phase example data models of ML engine 118 are trained based on information (e.g., a training dataset) stored in an example data lake 302. In some implementations, the training phase may initially require that all test result data be archived in a data lake 302. Data associated with the test results archived in the data lake 302 may be based on some (or all) of the tests cases described earlier with reference table 200 of FIG. 2. The data lake 302 may be organized as specific device type test cases, where the results of testing controls for individual assets are organized under a corresponding asset type 304, 306, 308, or 310.

The ML engine 118 can execute or manage the processing of an initial data set of test case results to train one or more data models. The ML engine 118 can generate the ML data lake model 120 based on inferences and predictions that are learned while training the one or more data models.

In the example of FIG. 3, the data models may be based on neural networks. In some implementations, each of the data models may be based on a single neural network or multiple neural networks. In some other implementations, the data models can be based on, or include, other types of machine-learning technologies, such as a classifier, a neural network, a feature generator, a support vector machine, a Bayesian network, or other related machine-learning technology.

Figure 4:
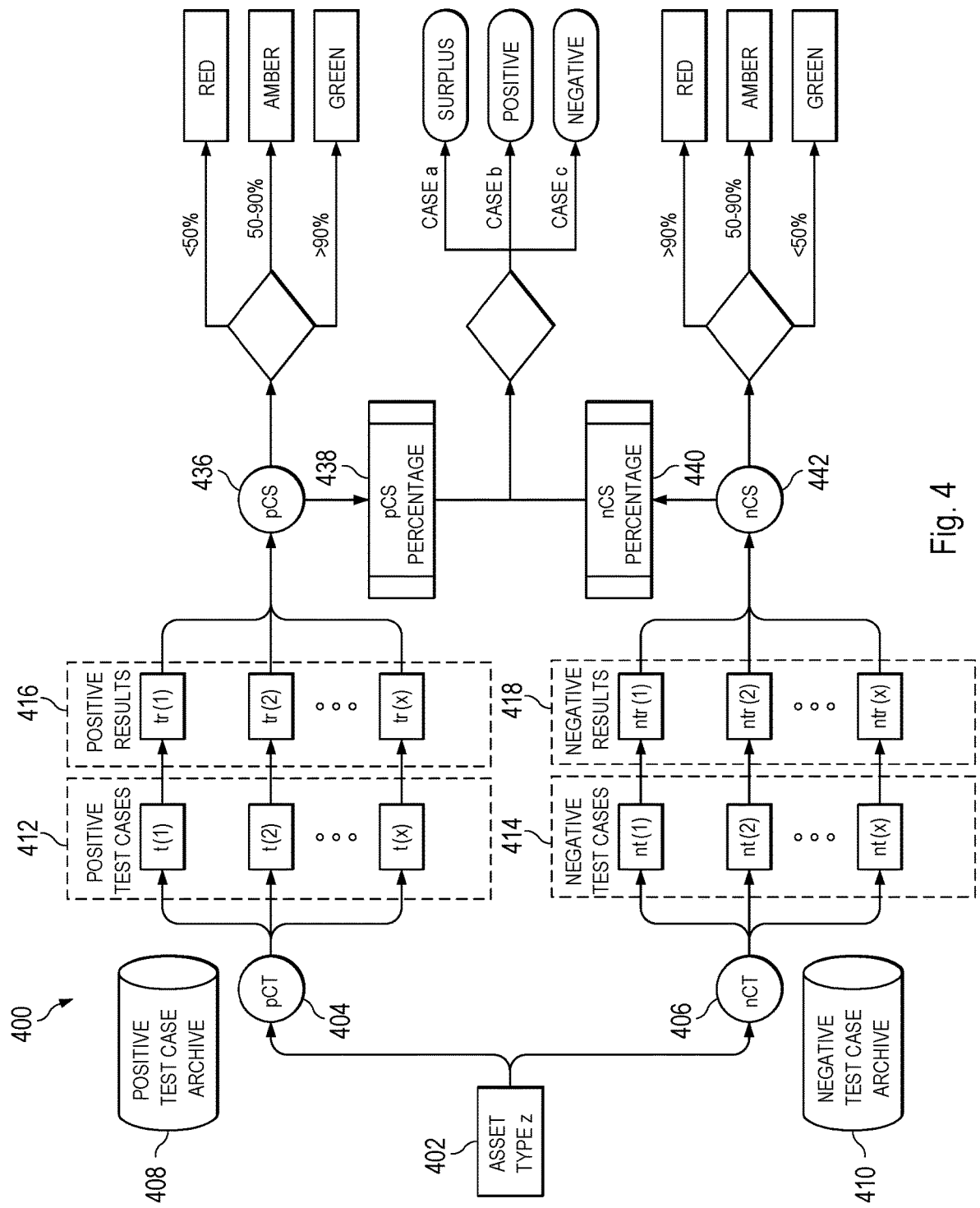
FIG. 4 shows an example process flow for implementing compliance verification testing using negative validation.

FIG. 4 shows an example process 400 for implementing compliance verification testing using negative validation. Process 400 can be implemented or executed using the system 100 described earlier as well as system 700 described later. The descriptions of process 400 may reference one or more of the computing resources of these systems. The steps or actions of process 400 may be enabled by programmed firmware or software instructions executable by one or more processors of the resources described in this document.

The steps of process 400 can correspond to a method of compliance testing to evaluate controls 104 used to protect assets 402 of a target system 102. A respective first score is generated for each control 104 based on one or more positive compliance tests (412). The pCTs may be derived from a positive test archive 408 and are performed to detect each of the controls 104 at the target system 102. A negative test case archive 410 can include one or more negative test cases 122.

The compliance model (e.g., the ML model 120) derives a negative compliance test 406 based at least on information in the data lake described earlier. The ML model 120 derives negative compliance tests (414) for each positive compliance test at least by applying predictive analytics to a data set of results (416) for each positive test case. The results can include a respective first score (436) for each of the controls 104. For example, based on a subset of test cases (412), a positive cumulative score (pCS) can be calculated as: $pCS=\Sigma_{i=1}^{y}t(i)$.

For each control 104 detected at the target system 102, the system 100 performs a negative compliance test 406 that corresponds to a positive compliance test 404 performed to detect or evaluate the control. The system 100 generates a second score 442 for the negative compliance test 406 that is performed. For example, to implement negative validation, a number of negative compliance test cases (414) are derived, where each nCT is complementary to a corresponding pCT among the positive test cases (412). A failure in a negative test case results in an incremental increase in the nCS score (i.e., second score) and a Pass results in no increase in the score.

Based on a comparison 446 of a first score for the control 104 and the second score, the system 100 generates an assurance score that characterizes effectiveness of the control 104 at protecting an asset of the target system. In some implementations, the compliance model is configured such that each pCS and nCS test sequence is fully automated and false positives can be reduced over time and as the compliance model is better taught to identify anomalies.

The compliance model is configured to apply a negative validation algorithm to the positive results (416) to validate that the pCS (436) is accurate. As an example of a real-world implementation of this type of testing, verification of a pCS that results from a pCT 404 for detecting the presence of a valid AntiVirus (AV) signature file may be negatively validated by dropping a known malware test file onto the target system 102 and determining whether the appropriate AV response was detected.

Other examples include: [A] a pCT confirms that a configuration script appears to allow for the support of older versions of transport layer security (TLS) (i.e., versions 1.0 or 1.1), but a negative validation check confirms that the support for legacy TLS versions is not installed at a given system; [B] a pCT confirms that a clear text protocol is present, contravening a requirement to encrypt sensitive applications but a negative validation check confirms that the data transmission over the unencrypted protocol is unclassified or that the port redirects the transmission to an encrypted port immediately; and [C] a pCT confirms that a specific Microsoft Hotfix was not installed but a negative validation confirms that exploiting the issue protected by the Hotfix is not possible due to other compensating controls. In each of these examples the negative test case would allow for a reduction in the perceived risk, and therefore a corresponding modification in the response.

In some cases, modification of a response based on a reduced risk, or other insights gleaned from the negative validation techniques, can lead to reductions in the use of computational resources such as processor and memory. These reductions can provide computing efficiencies that translate to an improvement in the overall operation of system 100.

As part of the implementation process, the negative test cases are designed and introduced into the compliance verification process, on a per technology basis, and with reference to associated automated tools and documentation sets for evaluating the controls. In some implementations, the process for creating or deriving the negative test cases is performed automatically based on inferences and predictions generated by the ML model 120. The model processes information relating to the associated automated tools and documentation sets (e.g., control requirements 108) to determine a method of negatively validating a response function of a control intended to a protect an asset.

For example, if the target system 102 is a Microsoft Windows server, then negative test cases may be written in PowerShell, whereas target systems 102 based on Unix or Linux will likely have test cases created in Python. The creation of the negative cases based on these programming approaches can be an automated process that involves creating a database of test cases which can be consumed by the algorithmic framework process when run. In some other implementations, the process for creating or deriving the negative test cases is a manual process that uses any applicable sources of information.

Some outcomes or assurance scores of a verification test may indicate that implemented controls 104 provide protections that are a surplus (case a) to a compliance requirement, whereas other outcomes or assurance scores of may indicate that a pCS score is likely inaccurate (case c) and shows that a particular control 104 may be installed or designed as intended, but does not operating effectively or not designed effectively to provide the expected protection or response function. In some implementations, outcomes of a verification test indicate balance (case b) between positive and negative test cases, which reinforces the accuracy of the compliance test results and demonstrates that controls are both designed and operating effectively.

FIG. 5A is an example illustration that shows a method of calculating a percentage compliant result based on corresponding boundary conditions 502, 504, 506 for different percentage results. The percentage compliant result can be calculated using an algorithm of system 100, where boundary conditions of the algorithm can be adjusted to meet individual corporate risk models. In general, a percentage compliant result is used against a defined set of boundary conditions to determine the rating of a given asset ("RAG"). These boundary conditions are usually defined based on an organization's risk profiles.

To illustrate this control, a company may have 100 target assets and considers that greater than 90% of its systems being correctly configured is an acceptable position. The boundary for a green RAG result would be ">90%." If positive test cases confirm that patching is complete for 91 of the target systems, but Antivirus deployment has only been successful for 60 of the target systems, then this would equate to an overall score of 75.5% which would result in an amber RAG result.

As described earlier, the comparator and mapping module 114 is configured to process and map a pCS and nCS to one of multiple boundary conditions in a set of boundary conditions. Each set of boundary conditions are specified by a risk profile 116 that is linked to a particular entity. In some implementations, the verification engine 106 includes multiple risk profiles 116, where each risk profile 116 corresponds to a different entity.

FIG. 5B shows an example illustration 550 that is used to graphically represent a positive compliance score (pCS) and a negative compliance score (nCS).

Figure 6:
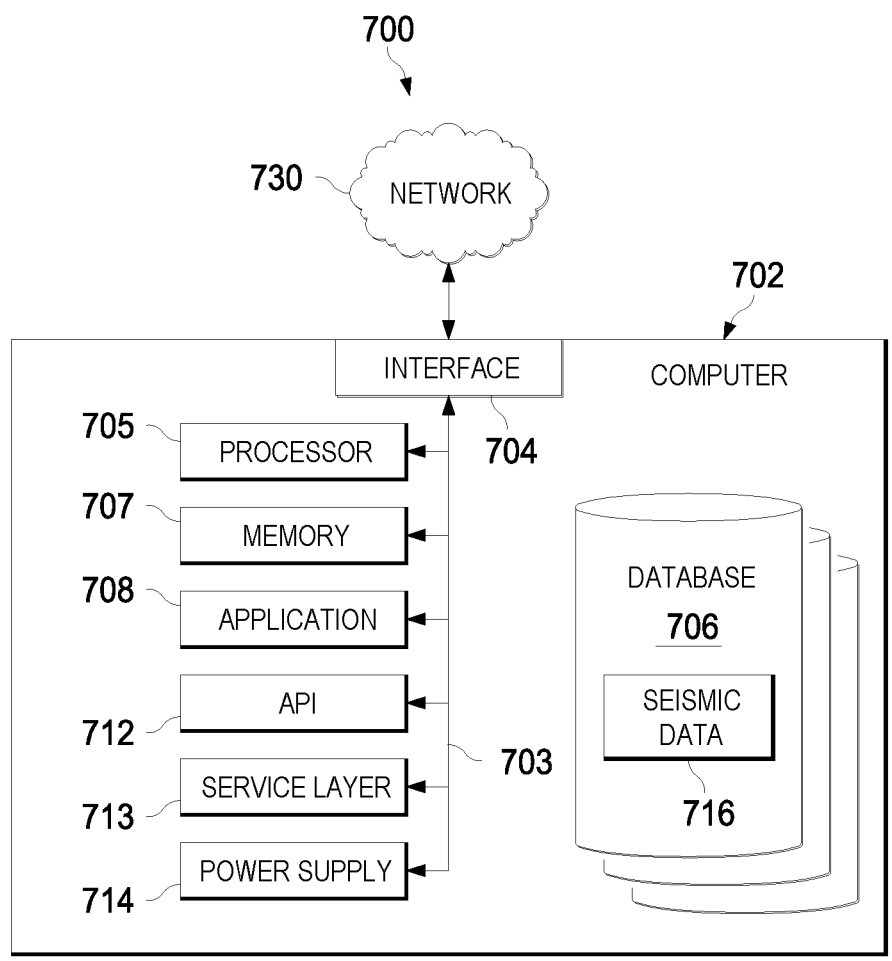
FIG. 6 is a block diagram illustrating an example computer system used to provide computational functionalities associated with described algorithms, methods, functions, processes, flows, and procedures according to some implementations of the present disclosure.

FIG. 6 is a block diagram of an example computer system 700 used to provide computational functionalities associated with described algorithms, methods, functions, processes, flows, and procedures described in the present disclosure, according to some implementations of the present disclosure.

The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

Generally, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data, including seismic data 716 (for example, seismic data described earlier at least with reference to FIG. 1), for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure.

Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include multiple user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method of compliance testing to evaluate controls used to protect assets of a target system, the method comprising:
   generating a respective first score for each control based on a plurality of compliance tests that are performed to detect each of the controls at the target system;
   generating a compliance model that integrates machine-learning algorithms to:
      i) classify inputs corresponding to a compliance test, and
      ii) enable predictive analytics of the compliance model using the classified inputs;
   deriving, by the compliance model, a negative compliance test for each of the plurality of compliance tests by applying the predictive analytics to a data set comprising the respective first score for each of the controls;
   for each control detected at the target system:
      performing a negative compliance test that corresponds to a compliance test performed to detect the control;
      generating a second score for the negative compliance test that is performed; and
      based on a comparison of a first score for the control and the second score, generating an assurance score that characterizes effectiveness of the control at protecting an asset of the target system.

2. The method of claim 1, wherein deriving a negative compliance test comprises:
   processing, based on the predictive analytics of the compliance model, information in the data set that describes assessment of a first control used to protect the asset of the target system;
   in response to processing the information, computing, by the compliance model, inferences that are indicative of a particular negative compliance test to be performed to assess a protection feature of the first control; and
   based on the computed inferences, deriving a first negative compliance test to assess effectiveness the first control and the protection feature at protecting the asset.

3. The method of claim 2, further comprising:
   negatively validating effectiveness of the first control and the protection feature at protecting the asset based on an outcome of the first negative compliance test.

4. The method of claim 2, wherein the predictive analytics of the compliance model comprises a negative validation algorithm that is applied to each first score to validate a respective accuracy of the first score.

5. The method of claim 4, wherein:
   a first control comprises a response function that is responsive to a particular incident; and
   the negative validation algorithm is applied to a corresponding first score for the first control to negatively validate efficacy of the response function.

6. The method of claim 5, wherein:
   the particular incident indicates an attempt at unauthorized access of the asset; and
   the response function of the first control protects the asset by precluding unauthorized access.

7. The method of claim 1, wherein generating the assurance score comprises:
   determining a measure of effectiveness of the control at precluding unauthorized access to an asset of the target system; and
   generating the assurance score based on the determined measure of effectiveness.

8. The method of claim 1, wherein the assurance score quantifies the measure of effectiveness of the control at precluding unauthorized access to the asset of the target system.

9. The method of claim 1, wherein:
   the first score is a positive compliance score that indicates presence of a given control configured to protect the asset; and
   the second score is a negative compliance score that assess a capability of the given control to protect the asset.

10. The method of claim 1 further comprising:
    generating a percent compliant based on the respective first score for each of the controls;
    applying the percent compliant to a boundary condition that defines a risk profile of an entity that includes the target system; and
    determining an asset rating that characterizes protection of the asset relative to the boundary condition in response to applying the percent compliant to the boundary condition.

11. A computing system for implementing compliance testing to evaluate controls used to protect assets of a target system, the system comprising one or more processing devices and one or more non-transitory machine-readable storage devices storing instructions that are executable by the one or more processing devices to cause performance of operations comprising:
    generating a respective first score for each control based on a plurality of compliance tests that are performed to detect each of the controls at the target system;
    generating a compliance model that integrates machine-learning algorithms to:
       i) classify inputs corresponding to a compliance test, and
       ii) enable predictive analytics of the compliance model using the classified inputs;
    deriving, by the compliance model, a negative compliance test for each of the plurality of compliance tests by applying the predictive analytics to a data set comprising the respective first score for each of the controls;
    for each control detected at the target system:
       performing a negative compliance test that corresponds to a compliance test performed to detect the control;
       generating a second score for the negative compliance test that is performed; and
       based on a comparison of a first score for the control and the second score, generating an assurance score that characterizes effectiveness of the control at protecting an asset of the target system.

12. The computing system of claim 11, wherein deriving a negative compliance test comprises:
    processing, based on the predictive analytics of the compliance model, information in the data set that describes assessment of a first control used to protect the asset of the target system;
    in response to processing the information, computing, by the compliance model, inferences that are indicative of a particular negative compliance test to be performed to assess a protection feature of the first control; and
    based on the computed inferences, deriving a first negative compliance test to assess effectiveness the first control and the protection feature at protecting the asset.

13. The computing system of claim 12, wherein the operations further comprise:

negatively validating effectiveness of the first control and the protection feature at protecting the asset based on an outcome of the first negative compliance test.

14. The computing system of claim 12, wherein the predictive analytics of the compliance model comprises a negative validation algorithm that is applied to each first score to validate a respective accuracy of the first score.

15. The computing system of claim 14, wherein:
a first control comprises a response function that is responsive to a particular incident; and
the negative validation algorithm is applied to a corresponding first score for the first control to negatively validate efficacy of the response function.

16. The computing system of claim 15, wherein:
the particular incident indicates an attempt at unauthorized access of the asset; and
the response function of the first control protects the asset by precluding unauthorized access.

17. The computing system of claim 11, wherein generating the assurance score comprises:
determining a measure of effectiveness of the control at precluding unauthorized access to an asset of the target system; and
generating the assurance score based on the determined measure of effectiveness.

18. The computing system of claim 11, wherein the assurance score quantifies the measure of effectiveness of the control at precluding unauthorized access to the asset of the target system.

19. The computing system of claim 11, wherein:
the first score is a positive compliance score that indicates presence of a given control configured to protect the asset; and
the second score is a negative compliance score that assess a capability of the given control to protect the asset.

20. A non-transitory machine-readable storage device storing instructions for implementing compliance testing to evaluate controls used to protect assets of a target system, the instructions being executable by a processing device to cause performance of operations comprising:
generating a respective first score for each control based on a plurality of compliance tests that are performed to detect each of the controls at the target system;
generating a compliance model that integrates machine-learning algorithms to:
i) classify inputs corresponding to a compliance test, and
ii) enable predictive analytics of the compliance model using the classified inputs;
deriving, by the compliance model, a negative compliance test for each of the plurality of compliance tests by applying the predictive analytics to a data set comprising the respective first score for each of the controls;
for each control detected at the target system:
performing a negative compliance test that corresponds to a compliance test performed to detect the control;
generating a second score for the negative compliance test that is performed; and
based on a comparison of a first score for the control and the second score, generating an assurance score that characterizes effectiveness of the control at protecting an asset of the target system.

* * * * *